US012782666B2

(12) United States Patent
Konishi

(10) Patent No.: US 12,782,666 B2
(45) Date of Patent: Nov. 3, 2026

(54) DRIVE APPARATUS, OPTICAL SYSTEM, AND IMAGE PICKUPING APPARATUS

(71) Applicant: CANON KABUSHIKI KAISHA, Tokyo (JP)

(72) Inventor: Yusuke Konishi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 311 days.

(21) Appl. No.: 18/630,032

(22) Filed: Apr. 9, 2024

(65) Prior Publication Data

US 2024/0345358 A1 Oct. 17, 2024

(30) Foreign Application Priority Data

Apr. 11, 2023 (JP) ................................ 2023-064041

(51) Int. Cl.
*G02B 7/02* (2021.01)
*G02B 7/04* (2021.01)
*G03B 17/14* (2021.01)

(52) U.S. Cl.
CPC ............... *G02B 7/022* (2013.01); *G02B 7/04* (2013.01); *G03B 17/14* (2013.01)

(58) Field of Classification Search
CPC . G02B 7/022; G02B 7/04; G02B 7/14; G02B 7/10; G02B 7/102; G03B 2205/0046; G03B 2205/0053; G03B 17/56; G03B 17/561; H04N 23/69; H04N 23/55
See application file for complete search history.

(56) References Cited

U.S. PATENT DOCUMENTS

| | | | | |
|---|---|---|---|---|
| 2009/0299572 | A1* | 12/2009 | Fujikawa | G01C 21/26 701/36 |
| 2017/0003576 | A1* | 1/2017 | Hatakeyama | G03B 17/14 |
| 2017/0163858 | A1* | 6/2017 | Shiraishi | G02B 7/14 |

FOREIGN PATENT DOCUMENTS

| | | | | |
|---|---|---|---|---|
| JP | 2007108373 | A | * | 4/2007 |
| JP | 2011257694 | A | | 12/2011 |
| JP | 2015200703 | A | * | 11/2015 |

* cited by examiner

*Primary Examiner* — Jia X Pan
(74) *Attorney, Agent, or Firm* — ROSSI, KIMMS & McDOWELL LLP

(57) ABSTRACT

The plurality of contact pins include a VBAT terminal to which a driving power source for driving the motor is supplied and a PGND terminal corresponding to a ground level of the driving power source, and the VBAT terminal and the PGND terminal are disposed closer to the fastening member than, any other contact pins of the plurality of contact pins than the VBAT terminal and the PGND terminal.

12 Claims, 11 Drawing Sheets

DRIVE APPARATUS, OPTICAL SYSTEM, AND IMAGE PICKUPING APPARATUS

BACKGROUND OF THE INVENTION

Field of the Invention

The present disclosure relates to a drive apparatus, an optical system, and an image pickup apparatus.

Description of the Related Art

In the lens apparatus, an operation ring capable of arbitrarily operating photographing conditions such as focusing, zooming, and an aperture is provided in a lens exterior portion of the lens apparatus. In such a lens apparatus, a drive apparatus is attached to the outside of the lens barrel, and a drive gear of the drive apparatus is engaged with a gear of the operation ring, whereby the operation ring can be driven by using the drive apparatus. In order to construct a photographing environment in which photographing equipment is reduced for the purpose of securing mobility at the time of photographing, it is necessary to realize stable photographing regardless of a photographing time by operating a drive apparatus by power supply from a camera.

Japanese Patent Application Laid-Open No. 2007-108373 discloses a configuration in which connecting portions for supplying power to the electric zoom device and the lens unit are provided, and the connecting portions are electrically connected to each other when the electric zoom device is attached to the lens unit.

However, in the configuration disclosed in Japanese Patent Application Laid-Open No. 2007-108373, the contact pressure of the connecting portion is not stable depending on the positional relationship between the fixed position of the electric zoom device and the connecting portion to be electrically connected, and thus there is a concern that insufficient power may be supplied. Further, when the contact pressure is unstable, in order to stabilize the power supply, it is necessary to increase the size of the electrical components so that a large amount of current can flow.

SUMMARY OF THE INVENTION

The present disclosure has an object to provide a drive apparatus capable of stably supplying power without increasing the size of the device.

In order to achieve the above-mentioned object, according to the present disclosure, a drive apparatus attachable to a lens apparatus including an operation ring, the drive apparatus comprising: a first fixing portion for fixing the drive apparatus to the lens apparatus; an actuator for rotating the operation ring; and an electrical connection portion comprising a plurality of terminals electrically connected to the lens apparatus. The plurality of terminals includes a first terminal to which a first voltage for driving the actuator is supplied and a second terminal corresponding to a reference potential of the first voltage. The first terminal and the second terminal are disposed closer to the first fixing portion than, any other terminals of the plurality of terminals than the first and the second terminals.

Further features of the present invention will become apparent from the following description of exemplary embodiments with reference to the attached drawings.

DESCRIPTION OF THE EMBODIMENTS

Embodiment

Figure 1:
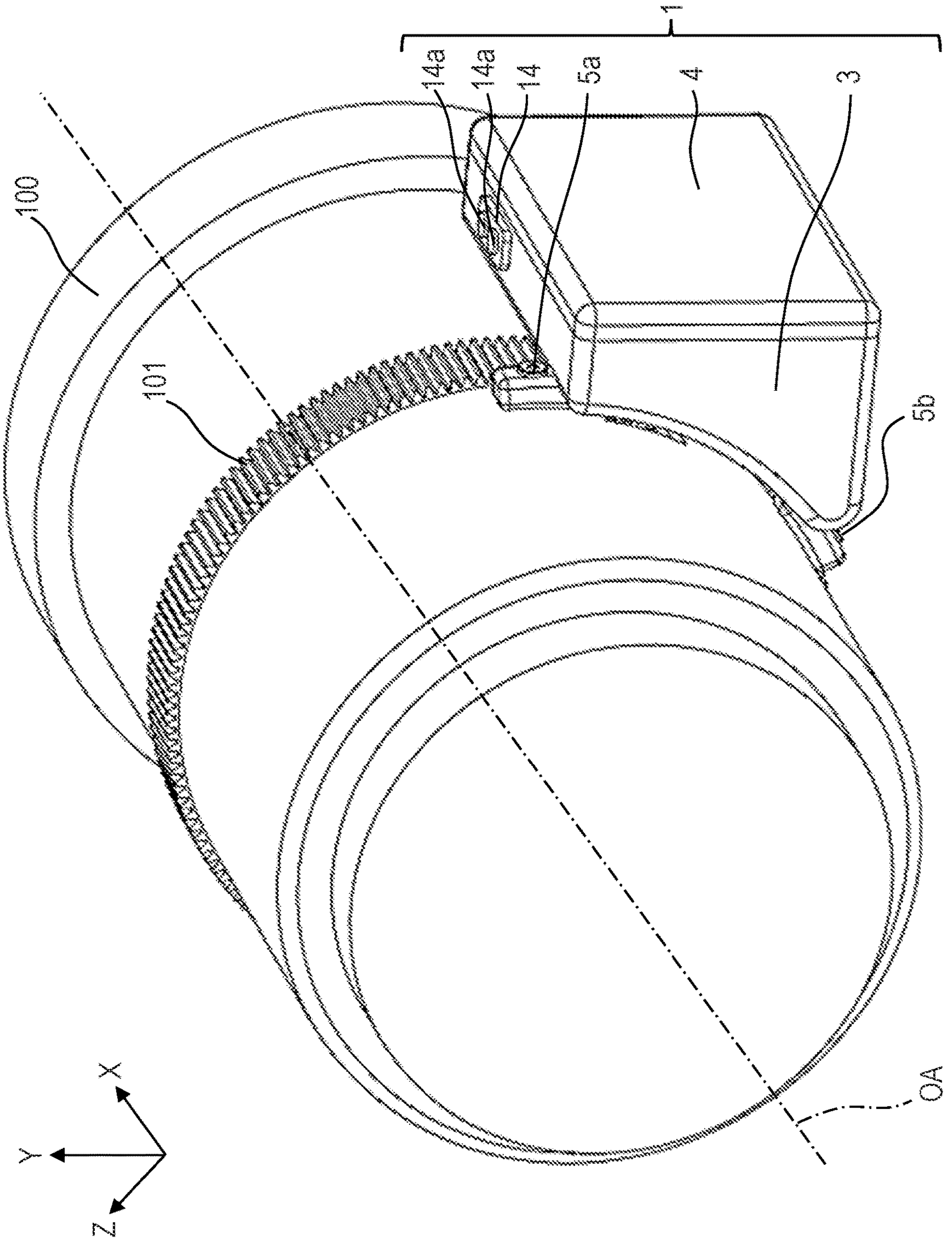
FIG. 1 is a perspective view illustrating a state in which a drive apparatus (1) is mounted on a lens apparatus (100).
Figure 2:
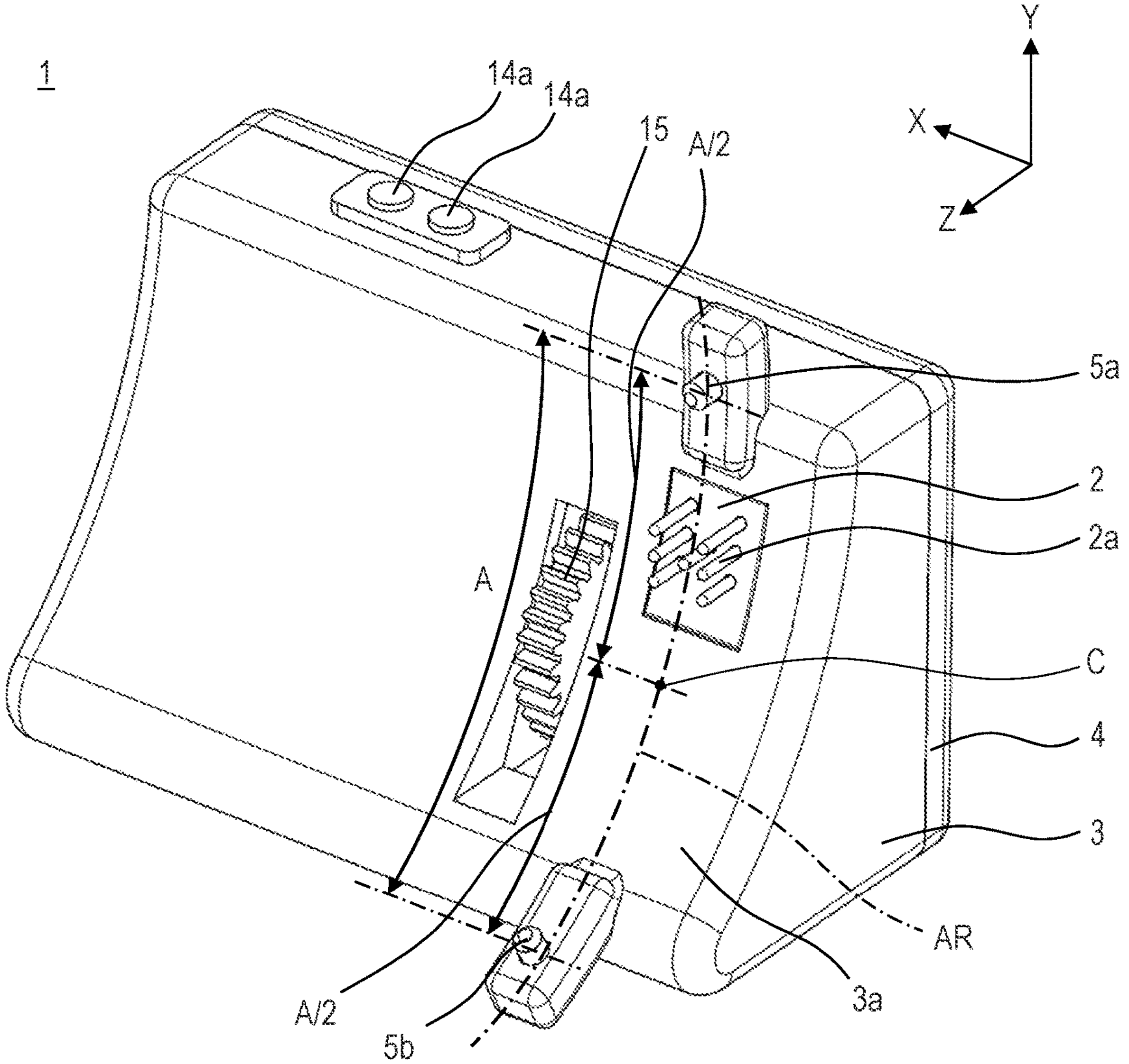
FIG. 2 is a perspective view of the drive apparatus (1).

Preferred embodiments of the present disclosure will now be described in detail in accordance with the accompanying drawings. FIG. 1 is a perspective view illustrating a state in which a drive apparatus 1 is mounted on a lens apparatus 100, and an optical system includes the drive apparatus 1 and the lens apparatus 100. FIG. 2 is a perspective view illustrating a state before the drive apparatus 1 is attached to the lens apparatus 100. In the drawings the direction of the optical axis OA is the X direction, the radial direction of the lens apparatus 100 is the Z direction, and the direction orthogonal to both the X direction and the Z direction is the Y direction.

The lens apparatus 100 according to the embodiment is provided with an operation ring 101 in which a gear for setting a zoom photographing state by a rotation operation is formed, and another operation ring (not illustrated) in which a gear for setting a focus photographing state or an aperture photographing state is formed. The drive apparatus 1 has an exterior member mainly constituted by a base member 3 and a cover member 4. The base member 3 and the cover member 4 are fastened by a fixing member (not illustrated). The material of the base member 3 and the cover member 4 is metal or resin. Further, the base member 3 and the cover member 4 are plated or coated.

The base member 3 of the drive apparatus 1 is disposed on the curved surface 3*a* has a curved shape corresponding to the shape of the fixed outer peripheral surface of the outer peripheral portion of the lens apparatus 100. The curved surface 3*a* has one arc AR, and a plurality of fastening members 5*a* and 5*b* for fixing the drive apparatus 1 to the lens apparatus 100 along the arc AR. The drive apparatus 1 is attachable to and detachable attached to the lens apparatus 100 via the fastening members 5*a* and 5*b*. The fastening members 5*a* and 5*b* may be screws that are crewed into the lens apparatus 100, and the drive apparatus 1 is fixed to the lens apparatus 100 by fastening the fastening members 5*a* and 5*b*. In the embodiment, one fastening member 5*a* (first fixing portion), the other fastening member 5*b* (second fixing portion), and the electrical connection portion 2 are provided on one arc of the curved surface 3*a*. The electrical connection portion 2 is arranged closer to the fastening member 5*a* than a center point C between the fastening member 5*b* and the fastening member 5*a* on the arc.

Figure 3:
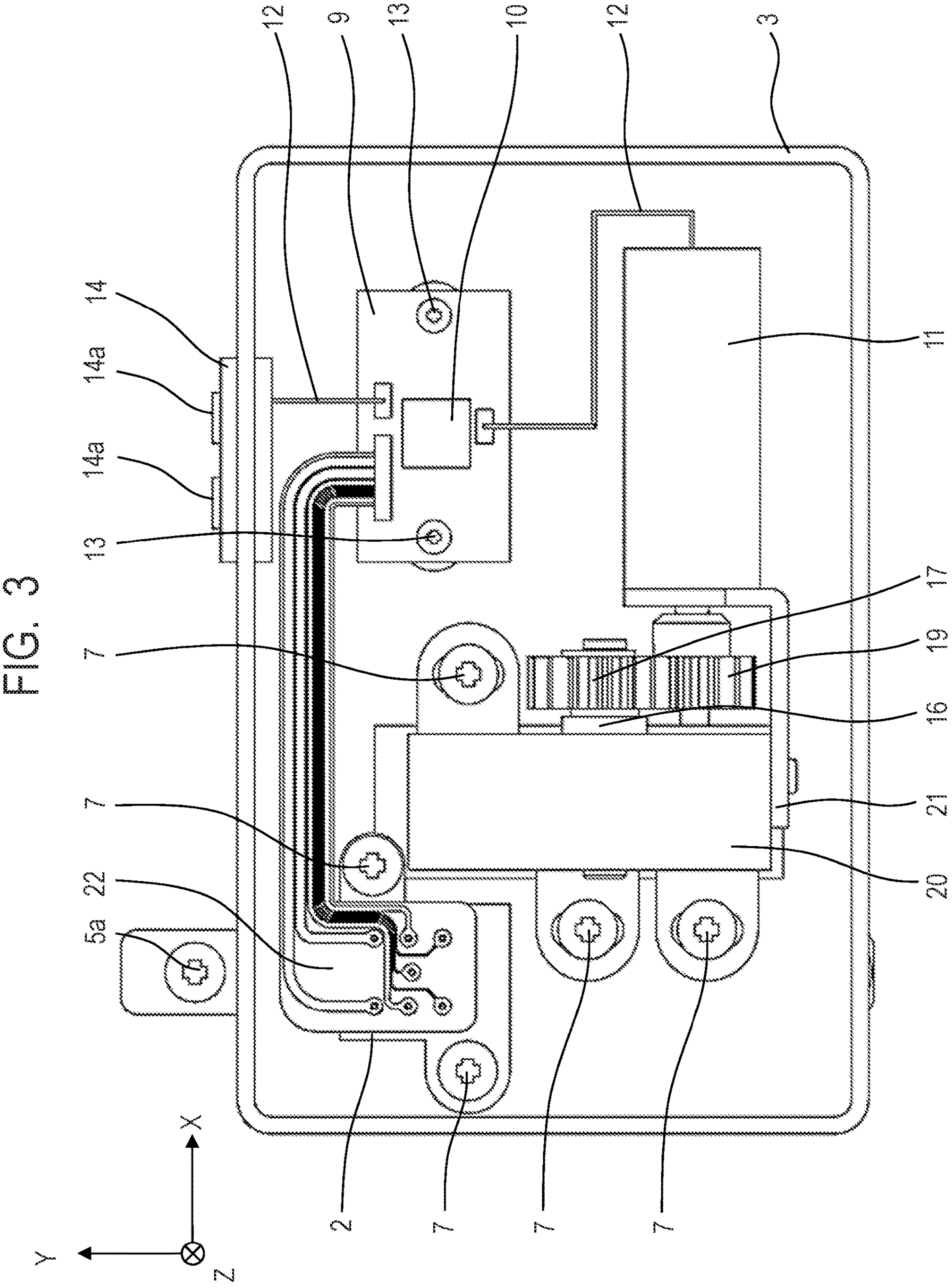
FIG. 3 is a front view illustrating an internal configuration of the drive apparatus (1).
Figure 4:
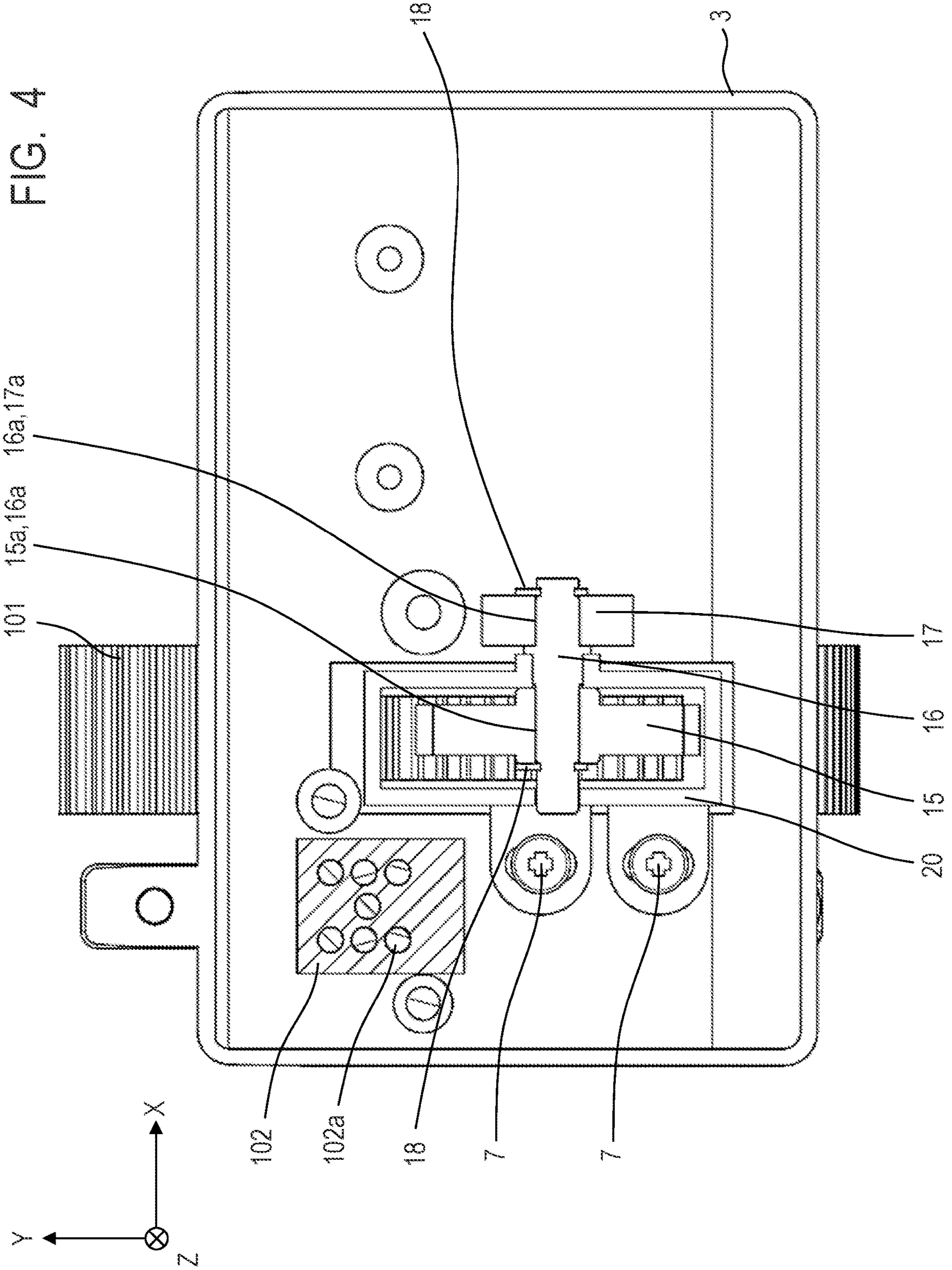
FIG. 4 is a cross-sectional view illustrating the periphery of the drive gear (15) of the drive apparatus (1).

FIG. 3 is a front view illustrating the arrangement of the components of the drive apparatus 1 disposed inside the base member 3, and FIG. 4 is a cross-sectional view of a main part of the drive apparatus 1. With reference to FIGS. 3 and 4, an internal configuration of the drive apparatus 1 disposed on the base member 3 will be described. An electrical connection portion 2, a substrate 9, a motor 11 (actuator), various gears, a partition member 20, a flexible printed circuit (FPC) 22, and the like are disposed inside the drive apparatus 1.

The electrical connection portion 2 is formed of a non-conductive resin and is fixed to the inside of the base member 3 by a fixing member 7. A plurality of contact pins 2*a* (terminals, pin terminals) are provided so as to protrude from the electrical connection portion 2 toward the lens apparatus 100. The contact pin 2*a* is made of a highly conductive material, is press-fitted into the electrical connection portion 2 and is held therein. The contact pin 2*a* can expand and contract in the protruding direction due to its plunger-type structure. The electrical connection portion 2 is electrically connected to the lens apparatus 100 by a plurality of contact pins 2*a*.

The electrical connection portion 2 is provided in the vicinity of any one of at least two fastening members 5*a* and 5*b* for fixing the drive apparatus 1 to the lens apparatus 100. In the embodiment, the electrical connection portion 2 is disposed on the same circular arc as the two fastening members 5*a* and 5*b* and is disposed close to one fastening member 5*a*, but the present disclosure is not limited thereto, and even in a case where there are three or more fastening members, the electrical connection portion may be disposed at a position close to any one of the fastening members.

The substrate 9 has a flat plate shape and is fixed to the base member 3 by two fixing members 13. The substrate 9 is connected to a plurality of electrical components by wire 12 and the substrate 9 is capable of communicating electrical signals and supplying current for driving the motor 11. The drive switch 14 is fastened to the base member 3 by a fixing member (not illustrated). Two switch portions 14*a* are provided on the upper surface of the drive switch 14. When one of the two switch portions 14*a* of the drive switch 14 is pressed, the motor 11 is operated, and torque is transmitted from each gear group to be described later, so that a zoom operation to the wide-angle side or the telephoto side can be performed.

The FPC 22 is an electrical component that connects an electrical signal or current input to each of the contact pins 2*a* of the electrical connection portion 2 to the substrate 9. In the embodiment, on the substrate 9, the motor 11, the electrical connection portion 2, and the drive switch 14 are connected to each other via the wire 12 or the FPC 22, but the present disclosure is not limited thereto. For example, electrical components for various purposes, such as a USB (universal serial bus) and an external communication connector, may be connected.

Next, a driving mechanism portion configured inside the base member 3 will be described. The drive gear 15 has a substantially cylindrical shape, has a gear teeth surface formed on an outer diameter surface thereof, and meshes with the operation ring 101, and a shaft member 16 is fitted to an inside diameter surface of the drive gear 15. D-cut surfaces 15*a* and 17*a* are formed on the inner peripheral surface of the drive gear 15 and the inner peripheral surface of the transmission gear 17, respectively. Two D-cut surfaces 16*a* are formed on the outer diameter surface of the shaft member 16. The D-cut surfaces 16*a* and 17*a* of the drive gear 15 and the transmission gear 17 are fitted to the D-cut surface 15*a* of the shaft member 16, so that the drive gear 15 and the transmission gear 17 are integrally rotated via the shaft member 16. The drive gear 15 and the transmission gear 17 are fixed to the shaft member 16 by the E-ring 18, so that the drive gear 15 and the transmission gear 17 are prevented from being displaced in the axial direction and from falling off from the shaft member 16.

The motor gear 19 has a substantially circular shape, a gear teeth surface is formed on an outer diameter surface, and a motor shaft is fitted to an inside diameter surface. The motor gear 19 is fastened by bringing a tip of a set screw (not illustrated) screwed into the motor gear 19 into contact with a D-cut surface (not illustrated) provided on the motor shaft. Thus, the motor gear 19 rotates integrally with the rotation of the motor shaft.

The partition member 20 supports the shaft member 16 and rotatably holds the drive gear 15 therein via the shaft member 16. The motor 11 is fixed to the partition member 20 by an L-shaped metal plate 21 using a fixing member (not illustrated). With the above configuration, the partition member 20 is fastened to the base member 3 in a state of holding the motor 11 for electrically operating the operation ring 101 and the plurality of gears for transmitting the driving force of the motor 11 to the operation ring 101.

In FIG. 4, an electrical connection portion 102 (second electrical connection portion) provided in the lens apparatus 100 is indicated by hatching for the sake of description, but the electrical connection portion 102 cannot be seen from the inside of the base member 3. The lens apparatus 100 has the electrical connection portion 102 which is electrically connected to the electrical connection portion 2 of the drive apparatus 1 on the outer peripheral portion thereof, and the operation ring 101 of the lens apparatus 100 is rotationally driven by the motor 11 of the drive apparatus 1. The electrical connection portion 102 is fixed to the lens apparatus 100 by a fixing member (not illustrated). The electrical connection portion 102 are formed of non-conductive resins, and the terminals 102*a* of the electrical connection portion 102 are formed of highly conductive metals. The terminals 102*a* may be integrally molded with or press-fitted into the electrical connection portion 102.

Figure 5:
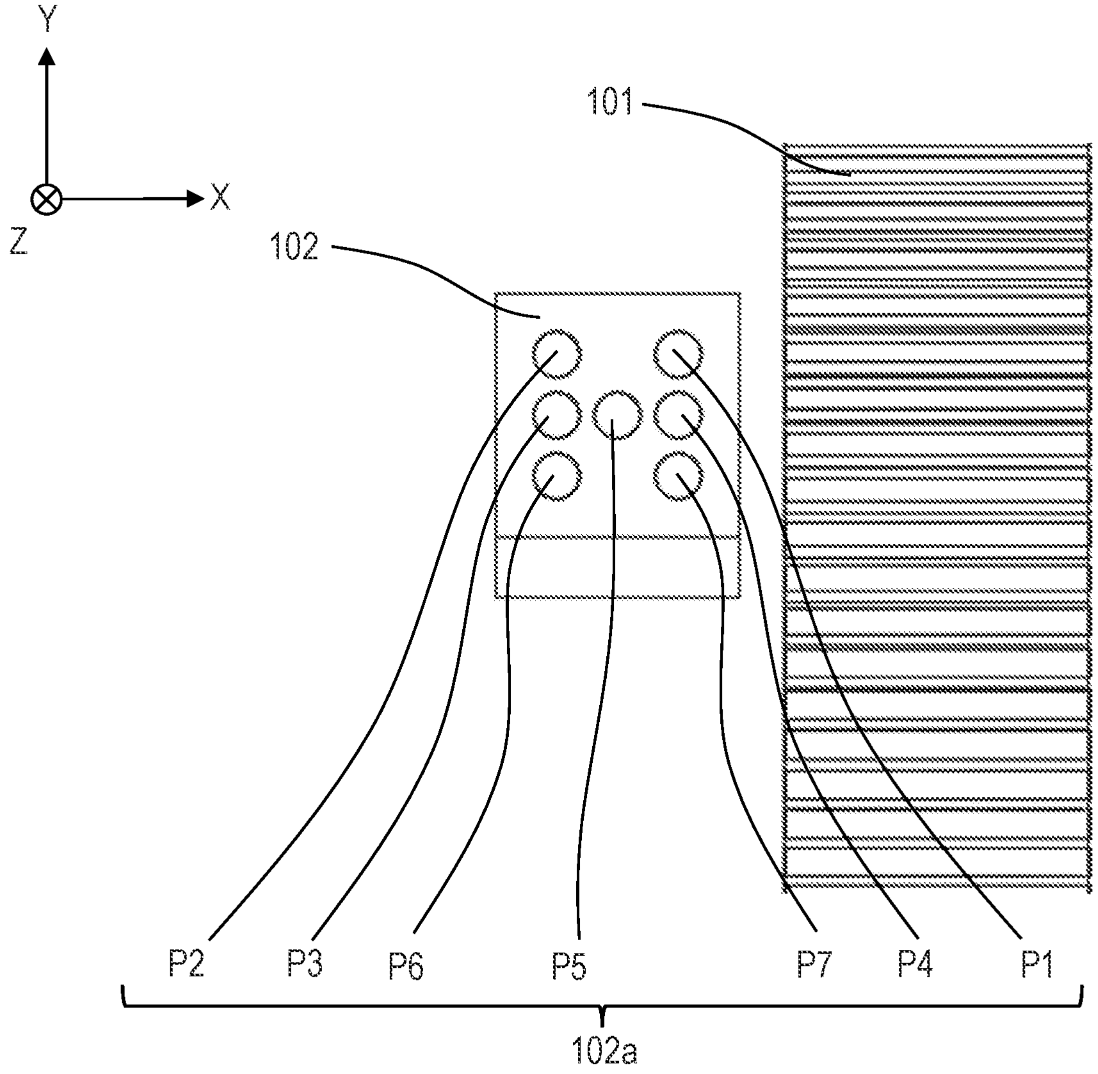
FIG. 5 is a partially enlarged view illustrating the configuration of the electrical connection portion (102) of the lens apparatus (100).
Figure 6:
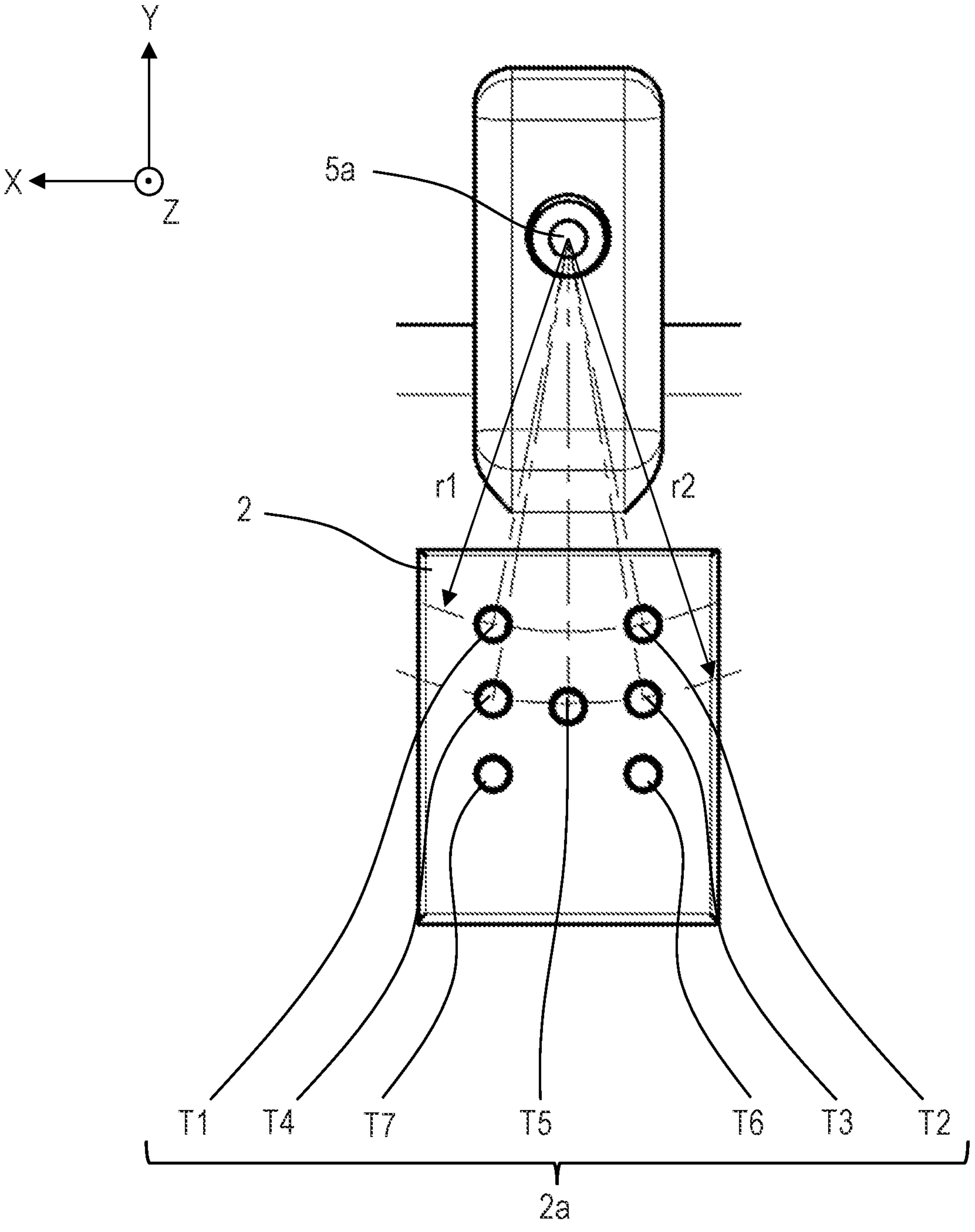
FIG. 6 is a partially enlarged view illustrating the configuration of the electrical connection portion (2) of the drive apparatus (1).

FIG. 5 is a partially enlarged view of the electrical connection portion 102 provided in the lens apparatus 100, and FIG. 6 is a partially enlarged view of the electrical connection portion 2 provided in the drive apparatus 1. With reference to FIGS. 5 and 6, the functions of the electrical contact terminals formed in the electrical connection portion 2 and the electrical connection portion 102 will be described.

The VBAT terminal T1 (first terminal) of the electrical connection portion 2 and the VBAT terminal P1 of the electrical connection portion 102 are terminals for supplying a driving power supply VBAT (first voltage) as driving power used for driving the motor 11 from the lens apparatus 100 to the drive apparatus 1. In other words, the VBAT terminals T1 and P1 are terminals used to supply power other than communication power, which will be described later, from the lens apparatus 100 to the drive apparatus 1. The PGND terminal T2 (second terminal) of the electrical connection portion 2 and the PGND terminal P2 of the electrical connection portion 102 are terminals corresponding to the ground level (reference potential) of the drive power supply VBAT of the drive system of the motor 11. That is, the PGND terminals T2 and P2 are ground terminals corresponding to the driving power supply VBAT.

The VDD terminal T3 (third terminal) of the electrical connection portion 2 and the VDD terminals P3 of the electrical connection portion 102 are terminals for supplying a communication control power supply VDD (second voltage) as communication power mainly used for communication control from the lens apparatus 100 to the drive apparatus 1. The DGND terminal T4 (fourth terminal) of the electrical connection portion 2 and the DGND terminal P4 of the electrical connection portion 102 are terminals corresponding to the ground level (reference potential) of the communication control power supply VDD. That is, the DGND terminals T4 and P4 are terminals indicating a voltage of a reference voltage level (ground level) corresponding to the communication control power supply VDD and predetermined terminals used for other communication. The PGND terminals T2 and P2, and the DGND terminals T4 and P4 described above are also ground terminals for connecting various power supply systems of the lens apparatus 100 and the drive apparatus 1 to a ground level (reference voltage level).

The MIF terminal T5 (fifth terminal) of the electrical connection portion 2 and the MIF terminal P5 of the electrical connection portion 102 are terminals to use to detect that the drive apparatus 1 is attached to the lens apparatus 100 (determining whether it is attached). The control unit 10 configured on the substrate 9 detects that the drive apparatus 1 is attached to the lens apparatus 100 and that the drive apparatus 1 is detached from the lens apparatus 100 based on the voltage values detected by the MIF terminals T5 and P5. Then, after detecting the attachment of the drive apparatus 1, for example, by detecting the MIF terminals T5 and P5, the control unit 10 starts supplying power to the power system terminals (VDD terminals T3, P3, VBAT terminals T1, P1) and performs control to start communication between the lens apparatus 100 and the drive apparatus 1. The communication terminals T6 and T7 of the electrical connection portion 2 and the communication terminals P6 and P7 of the electrical connection portion 102, which are the other terminals, are terminals used for communication between the lens apparatus 100 and the drive apparatus 1.

Figure 7:
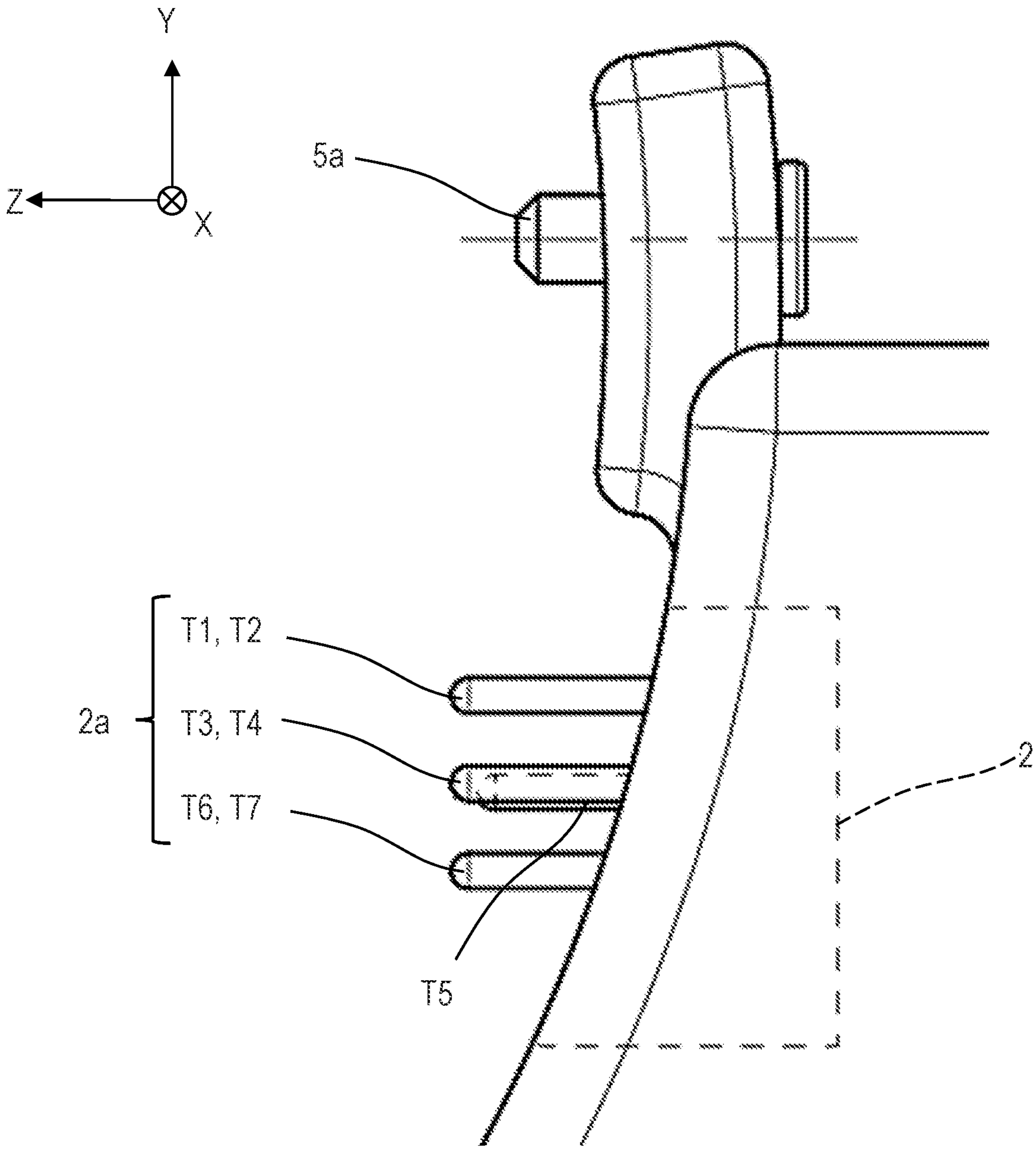
FIG. 7 is a partial side view illustrating the configuration of the electrical connection portion (2) of the drive apparatus (1).

FIG. 7 illustrates a side view of the electrical connection portion 2 of the drive apparatus 1. Referring to FIG. 7, the arrangement of the contact pins 2*a* configured on the electrical connection portion 2 is explained. The plurality of contact pins 2*a* protrude in the direction in which a tip portion of the fastening member 5*a* formed by a screw protrudes. That is, by making the fastening direction of the drive apparatus 1 and the protruding direction of the contact pins 2*a* substantially the same direction, so that a change in the pressing force due to misalignment of the mounting position of the drive apparatus 1 can be suppressed. In addition, since the MIF terminal T5 among the contact pins 2*a* is set to have a lower protrusion amount in a non-compressed state than the other contact pins 2*a*, so the length of the MIF terminal T5 is the shortest among the plurality of terminals and is disposed at a position surrounded by the contact pins other than the MIF terminal T5. Further, the length of the VBAT terminal T1 and the PGND terminal T2 are the longest among the plurality of terminals. Therefore, when the drive apparatus 1 is attached to the lens apparatus 100, after the terminal other than the MIF terminal T5 (other than the fifth terminal) among the plurality of contact pins 2*a* are electrically connected, regardless of the mounting direction, the MIF terminal T5 is connected to the MIF terminal P5 on the lens apparatus 100 side at the end. After detecting the energization of the MIF terminals T5 and P5, power supply to power system terminals is started to prevent breakage of a substrate and malfunction.

The VBAT terminal T1 for supplying the drive power supply VBAT for driving the motor 11 and the ground terminal (PGND terminal T2) corresponding to the drive power supply VBAT are arranged at positions close to the fastening member 5*a* for fixing the drive apparatus 1 in the electrical connection portion 2. That is, as illustrated in FIG. 6, the VBAT terminal T1 and the PGND terminal T2 are arranged at positions r1 closest to the fastening member 5*a* among the plurality of contact pins 2*a*.

The VDD terminal T3 for supplying the communication control power supply VDD and the ground terminal (DGND terminal T4) corresponding to the communication control power supply VDD are arranged at positions next to the VBAT terminal T1 and the PGND terminal T2 with respect to the fastening member 5*a* for fixing the drive apparatus 1 in the electrical connection portion 2. That is, as illustrated in FIG. 6, the VDD terminal T3 and the DGND terminal T4 are arranged at position r2 which is farther away from the fastening member 5*a* than the VBAT terminal T1 and the PGND terminal T2, and the VDD terminal T3 and the DGND terminal T4 are arranged as the distance from the fastening member 5*a* increases among the plurality of contact pins 2*a*. That is, the VDD terminal T3 and the DGND terminal T4 are arranged at positions r2 farther from the fastening member 5*a* than the VBAT terminal T1 and the PGND terminal T2.

Here, the VBAT terminal T1 and the PGND terminal T2 are to stably drive the motor 11 in a steady state and to drive the motor 11 at a high speed, it is preferable to adopt a configuration in which a large amount of current can stably flow. Therefore, in the FPC 22 connecting each of the contact pins 2*a* to the substrate 9, the widths of the wire patterns connected to the VBAT terminal T1 and the PGND terminal T2 are set to be wider than those of the other wire patterns to suppress the electric resistance, thereby allowing a large amount of current to flow. For this reason, in the VDD terminal T3 and the DGND terminal T4, it is necessary to stably supply a current to cause various electrical components mounted on the substrate 9 to function. For this reason, in the FPC 22, it is possible to cause a relatively large amount of current to flow by setting the widths of the wire patterns of the VDD terminal T3 and the DGND terminal T4 to be wider than the wire patterns used for communication.

Furthermore, the position of the contact pin 2*a* can be brought close to the lens apparatus 100 in accordance with the fastening state of the drive apparatus 1, and the contact pin 2*a* can be firmly pressed when the lens apparatus 100 is mounted. Therefore, a large amount of current can flow through the VDD terminals T3 and P3 and the PGND terminals T2 and P2. Therefore, it is possible to suppress an increase in the line width of the FPC 22 and to contribute to a reduction in the size of the drive apparatus 1. As illustrated in FIG. 2, with respect to the arc length A connecting the two fastening members 5*a* and 5*b*, the electrical connection portion 2 is placed at a position close to one fastening member 5*a* rather than at the center point C, which is A/2 of the half arc length, so that stable electrical connection can be achieved regardless of the fastening state of the drive apparatus 1. By providing the electrical connection portion 2 in the vicinity of the fastening member 5*a* of the drive apparatus 1, the arc length connecting the fastening member 5*a* and the electrical connection portion 2 can be shortened, and the fluctuation of the pressing amount of the contact pin 2*a* due to the variation of the mounting diameters of the lens apparatus 100 and the fastening member 5*a* of the drive apparatus 1 can be suppressed.

When the drive apparatus 1 is attached to the lens apparatus 100, the contact pins 2*a* come into contact with the terminals 102*a* of the lens apparatus 100, so that power can be supplied from the lens apparatus 100 to the drive apparatus 1 and control signals can be input to and output from the drive apparatus 1, and the motor 11 of the drive apparatus 1 is driven by the power supply. According to the present embodiment, it is possible to provide the drive apparatus 1 capable of stably supplying power from the image pickup apparatus via the lens apparatus 100 without increasing the size of the apparatus.

Modified Embodiment

Figure 8A:
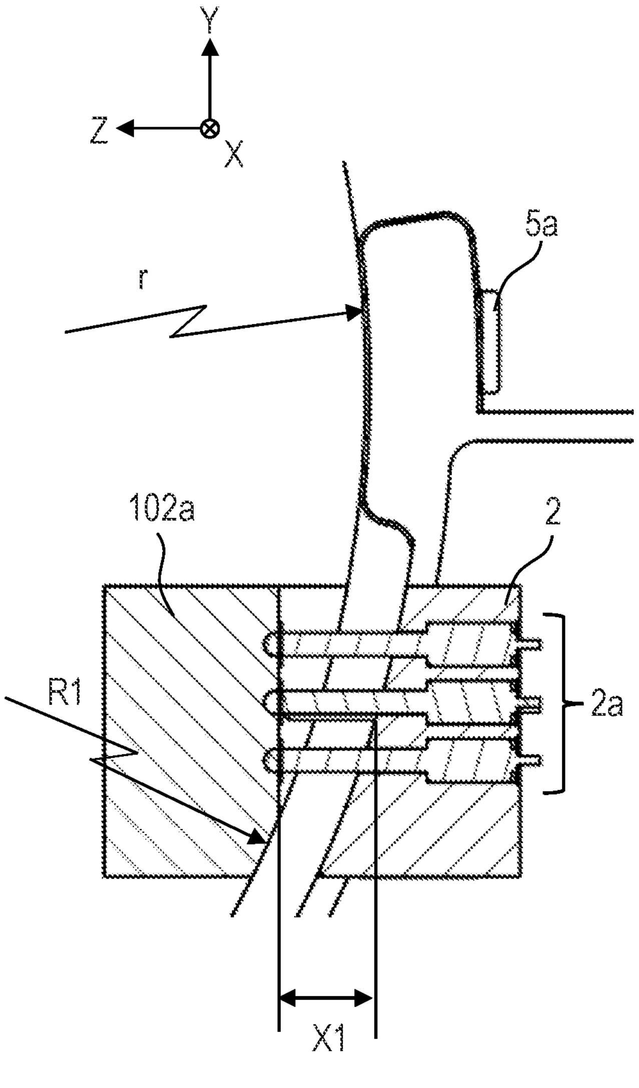
FIGS. 8A, 8B, and 8C are partial cross-sectional views of the electrical connection portion (2, 102) in a state where the drive apparatus (1) is attached to the lens apparatus (100).
Figure 8B:
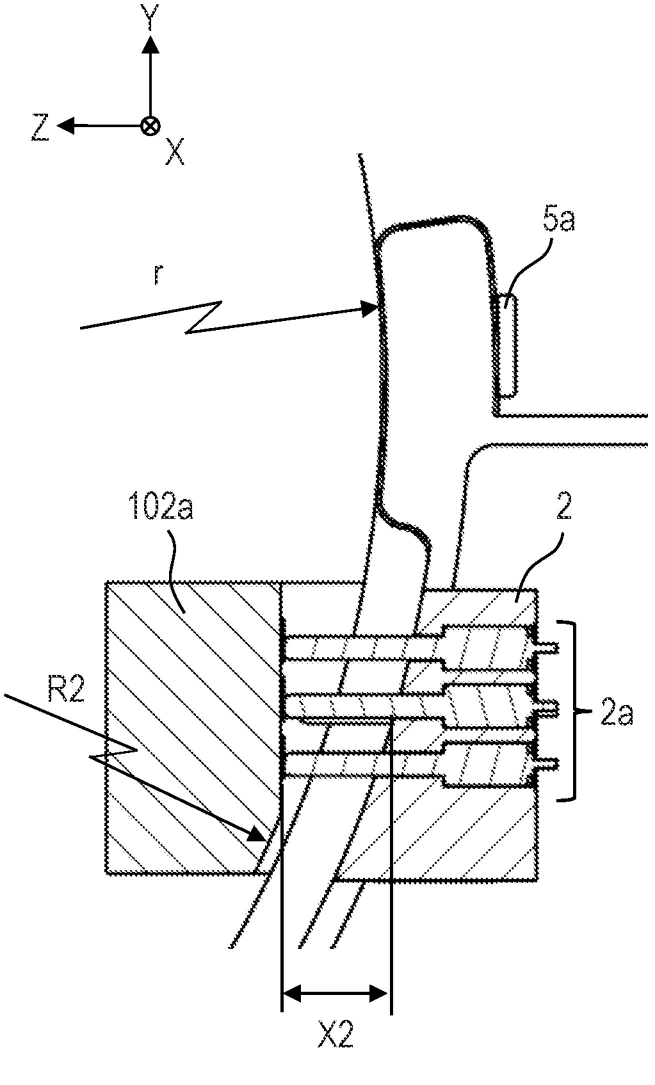
Figure 8C:
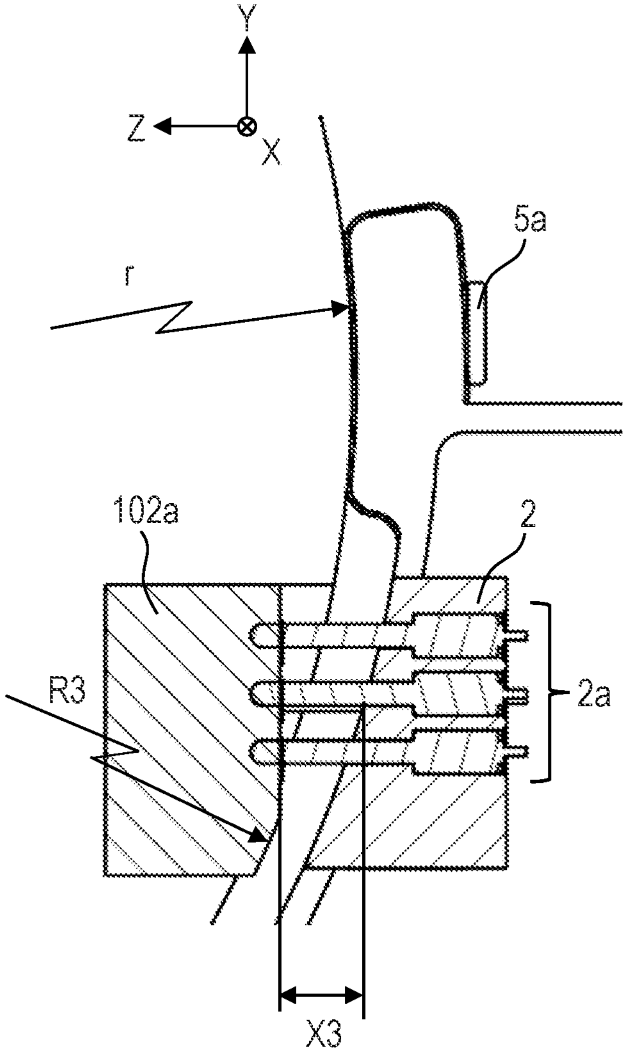

A modification in which the drive apparatus 1 is firmly fixed to the lens apparatus 100 and the contact pin 2*a* is reliably brought into contact with the electrical connection portion 102 even when the diameters of the lens apparatus 100 vary will be described. FIGS. 8A to 8C are partial cross-sectional views of the vicinity of the electrical connection portion 2 and 102 in a state where the drive apparatus 1 is attached and fixed to the lens apparatus 100. FIG. 8A illustrates a case where the radius R1 of the portion of the outer peripheral surface of the lens apparatus 100 facing the drive apparatus 1 is substantially the same as the curvature radius r of the curved surface 3*a* serving as the mounting portion of the drive apparatus 1, and the distance X1 is between the electrical connection portions 2 and 102. FIG. 8B illustrates a case in which the radius R2 of the portion of the outer peripheral surface of the lens apparatus 100 facing the drive apparatus is larger than the curvature radius r of the curved surface 3*a* serving as the mounting portion of the drive apparatus 1, and the distance X2 is between the electrical connection portions 2 and 102. FIG. 8C illustrates a case where the radius R3 of the portion of the outer peripheral surface of the lens apparatus 100 which faces the drive apparatus is smaller than the curvature radius r of the curved surface 3*a* which is the mounting portion of the drive apparatus 1, and the distance X3 is between the electrical connection portions 2 and 102.

Due to the difference in the radius R1~R3 of the lens apparatus 100, the distance X1~X3 between the electrical connection portions 2 and 102 of the lens apparatus 100 and the drive apparatus 1 has a relationship of X2>X1>X3. In a case where the radius R3 of the lens apparatus 100 is smaller than the curvature radius r of the curved surface 3*a* of the drive apparatus 1, a clearance (gap) is partially present between the lens apparatus 100 and the drive apparatus 1 in the circumferential direction. However, by disposing the electrical connection portion 102 close to the fastening member 5*a*, the drive apparatus 1 is fixed to the lens apparatus 100 by the fastening member 5*a* without a clearance in the vicinity of the fastening member 5*a*, and the contact pin 2*a* can be reliably brought into contact with the electrical connection portion 102. Therefore, it is possible to firmly press the contact pin 2*a* regardless of variations in the mounting diameters of the fastening portions of the lens apparatus 100 and the drive apparatus 1.

Application Example

Figure 9:
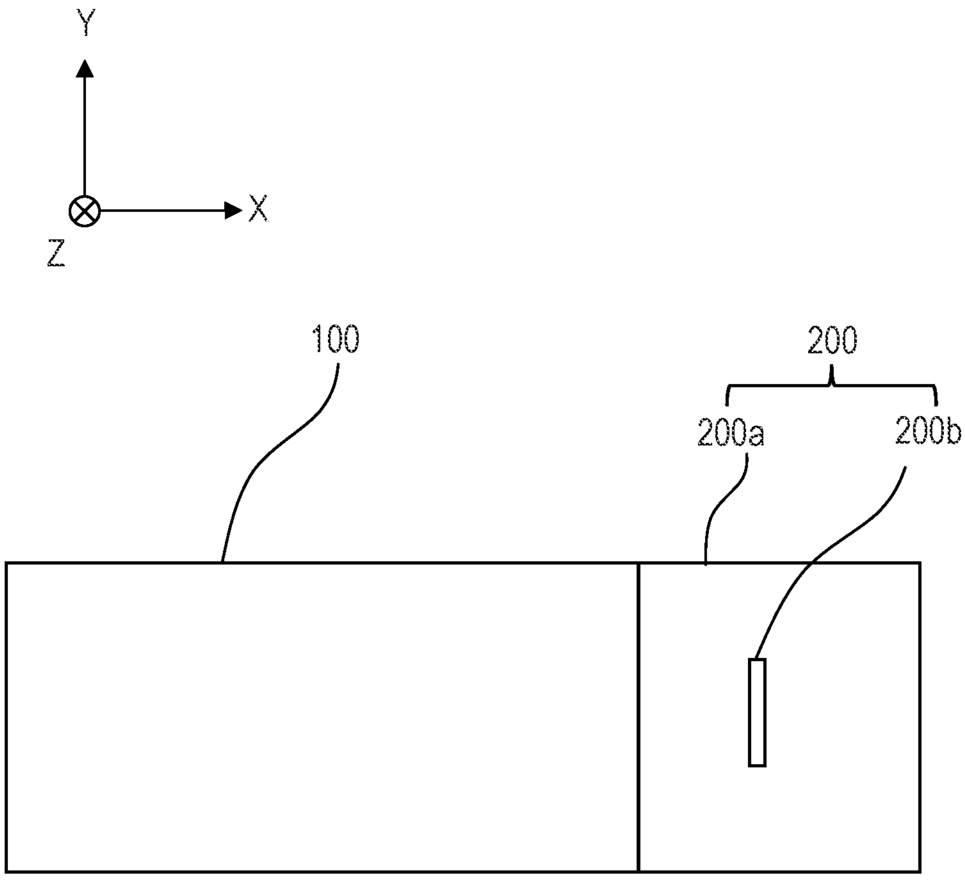
FIG. 9 is a schematic diagram illustrating a configuration example of an image pickup system.

FIG. 9 is a schematic diagram illustrating a configuration example of a camera apparatus 200 (image pickup apparatus) using the lens apparatus 100 (interchangeable lens for a camera) to which the present disclosure is applied. The image pickup apparatus includes a lens apparatus 100 including the drive apparatus 1, and a camera apparatus 200 including a camera body 200*a* having an image sensor 200*b* for capturing an image formed by the lens apparatus 100. The image pickup apparatus has a configuration in which the lens apparatus 100 is detachably mounted on the camera body 200*a* of the camera apparatus 200, but the camera body 200*a* and the lens apparatus 100 may be integrally configured.

Although the preferred embodiments of the present disclosure have been described above, the present disclosure is not limited to these embodiments, and various modifications and changes can be made within the scope of the gist of the present disclosure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-064041, filed Apr. 11, 2023, which is hereby incorporated by reference herein in its entirety.

What is claimed is:

1. A drive apparatus attachable to a lens apparatus including an operation ring, the drive apparatus comprising:
- a first fixing portion for fixing the drive apparatus to the lens apparatus;
- an actuator for rotating the operation ring;
- an electrical connection portion comprising a plurality of terminals electrically connected to the lens apparatus;
- an exterior member provided with a curved surface corresponding to a shape of an outer peripheral surface of the lens apparatus; and
- a second fixing portion arranged on an arc of the curved surface and configured to fix the drive apparatus to the lens apparatus,
- wherein the plurality of terminals includes a first terminal to which a first voltage for driving the actuator is supplied and a second terminal corresponding to a reference potential of the first voltage,
- wherein the first terminal and the second terminal are disposed closer to the first fixing portion than, any other terminals of the plurality of terminals than the first and the second terminals,
- wherein the electrical connection portion and the first fixing portion are provided on the arc, and
- wherein the electrical connection portion is disposed closer to the first fixing portion than a center point between the first fixing portion and the second fixing portion on the arc.

2. The drive apparatus according to claim 1, wherein the first fixing portion includes a screw that is screwed into the lens apparatus.

3. The drive apparatus according to claim 2, wherein the plurality of terminals is pin terminals that protrude in a direction in which a tip portion of the screw of the first fixing portion protrudes.

4. The drive apparatus according to claim 1, wherein a radius of a portion of an outer circumferential surface of the lens apparatus facing the drive apparatus is smaller than a radius of curvature of the curved surface.

5. The drive apparatus according to claim 1, wherein the plurality of terminals includes a third terminal to which a second voltage for communication control is supplied and a fourth terminal corresponding to a reference potential of the second voltage, and wherein the third terminal and the fourth terminal are disposed at positions farther from the first fixing portion than the first terminal and the second terminal.

6. The drive apparatus according to claim 5, wherein the plurality of terminals includes a fifth terminal used for determining whether or not the drive apparatus is mounted on the lens apparatus, wherein the fifth terminal is connected to the lens apparatus after terminals other than the fifth terminal among the plurality of terminals are connected to the lens apparatus.

7. The drive apparatus according to claim 6, wherein a length of the fifth terminal is the shortest among the plurality of terminals.

8. The drive apparatus according to claim 1, wherein lengths of the first terminal and the second terminal are the longest among the plurality of terminals.

9. The drive apparatus according to claim 1, wherein the actuator is driven by power supplied from the lens apparatus.

10. An optical system comprising:

a lens apparatus including an operation ring; and a drive apparatus attachable to the lens apparatus, wherein the drive apparatus comprises:

a first fixing portion for fixing the drive apparatus to the lens apparatus;

an actuator for rotating the operation ring;

an electrical connection portion comprising a plurality of terminals electrically connected to the lens apparatus;

an exterior member provided with a curved surface corresponding to a shape of an outer peripheral surface of the lens apparatus; and a second fixing portion arranged on an arc of the curved surface and configured to fix the drive apparatus to the lens apparatus, wherein the plurality of terminals includes a first terminal to which a first voltage for driving the actuator is supplied and a second terminal corresponding to a reference potential of the first voltage, wherein the first terminal and the second terminal are disposed closer to the first fixing portion than, any other terminals of the plurality of terminals than the first and the second terminals, wherein the electrical connection portion and the first fixing portion are provided on the arc, and wherein the electrical connection portion is disposed closer to the first fixing portion than a center point between the first fixing portion and the second fixing portion on the arc.

11. The optical system according to claim 10, wherein the lens apparatus has a second electrical connection portion electrically connected to the electrical connection portion of the drive apparatus.

12. An image pickup device comprising:

the optical system according to claim 10; and an image pickup element that captures an image formed by the lens apparatus.

* * * * *